US009925467B2

(12) United States Patent
Matsumoto

(10) Patent No.: US 9,925,467 B2
(45) Date of Patent: Mar. 27, 2018

(54) MOBILE TERMINAL WITH CALL FUNCTION OR TEXTING FUNCTION, OR A FUNCTION AS A GAME TERMINAL, GAME PROGRAM AND GAME METHOD EXECUTED BY MOBILE TERMINAL

(71) Applicant: Yoshinori Matsumoto, Osaka (JP)

(72) Inventor: Yoshinori Matsumoto, Osaka (JP)

( * ) Notice: Subject to any disclaimer, the term of this patent is extended or adjusted under 35 U.S.C. 154(b) by 0 days.

(21) Appl. No.: 15/584,176

(22) Filed: May 2, 2017

(65) Prior Publication Data

US 2018/0015376 A1    Jan. 18, 2018

Related U.S. Application Data

(63) Continuation-in-part of application No. 15/222,271, filed on Jul. 28, 2016.

(30) Foreign Application Priority Data

Jul. 14, 2016  (JP) .................................. 2016-139307

(51) Int. Cl.
H04W 4/02 (2009.01)
A63F 13/87 (2014.01)
(Continued)

(52) U.S. Cl.
CPC .......... *A63F 13/87* (2014.09); *H04L 12/1895* (2013.01); *H04L 12/28* (2013.01); *H04W 4/14* (2013.01); *H04L 2012/5671* (2013.01)

(58) Field of Classification Search
CPC ... H04W 4/027; H04W 40/18; H04W 40/246; H04W 4/028; H04W 64/006; H04W 88/02; H04W 48/04; H04W 52/0254
(Continued)

(56) References Cited

U.S. PATENT DOCUMENTS 8,565,820 B2    10/2013 Riemer et al.
2009/0298533 A1*    12/2009 Alameh ................ G06F 1/1626
                                                                    455/556.1
(Continued)

FOREIGN PATENT DOCUMENTS

JP    2008-011940    1/2008
JP    2010-081319    4/2010
(Continued)

OTHER PUBLICATIONS

International Search Report, PCT/JP2017/014033, dated Jul. 4, 2017.
Written Opinion, PCT/JP2017/014033, dated Jul. 4, 2017.

*Primary Examiner* — Keith Ferguson
(74) *Attorney, Agent, or Firm* — Potomac Law Group, PLLC; Kenneth Fagin

(57) ABSTRACT

The present invention provides a mobile terminal with a call function or a texting function. The present invention controls the use of a mobile terminal by a manual operation because of an incoming call during movement. Location information indicating movement of a mobile terminal with a call or a message data exchange function is received by a GPS receiver, the distance and the movement speed are determined by using the measurement information of the two locations at every predetermined time, and whether or not the mobile terminal is moving in accordance with the movement speed is determined by a movement determination unit. When it is determined by the movement determination unit that the mobile terminal is moving, the display of incoming call information indicating an incoming call is set to non-displayed on the display unit, and at the same time, a notification sound from a speaker, etc. is invalid.

10 Claims, 7 Drawing Sheets

(51) Int. Cl.
*H04W 4/14* (2009.01)
*H04L 12/28* (2006.01)
*H04L 12/18* (2006.01)
*H04L 12/70* (2013.01)

(58) Field of Classification Search
USPC ...... 455/567, 550.1, 412.1, 412.2, 441, 566,
455/575.1, 556.1, 73, 422.1, 403,
455/418–420, 41.1–41.3; 340/539.1,
340/539.11, 670, 461
See application file for complete search history.

(56) References Cited

U.S. PATENT DOCUMENTS

2011/0151842 A1* 6/2011 Olincy .............. H04M 3/42348
455/414.1
2013/0244631 A1* 9/2013 Phutane ................ H04W 4/16
455/414.1

FOREIGN PATENT DOCUMENTS

| JP | 2013-222977 | 10/2013 |
| JP | 2015-012321 | 1/2015 |
| JP | 2015-080189 | 4/2015 |
| WO | WO 2015098712 | 7/2015 |

* cited by examiner

MOBILE TERMINAL WITH CALL FUNCTION OR TEXTING FUNCTION, OR A FUNCTION AS A GAME TERMINAL, GAME PROGRAM AND GAME METHOD EXECUTED BY MOBILE TERMINAL

CROSS REFERENCE TO RELATED APPLICATIONS

The present application claims the benefit of priority on the basis of the Japanese Patent Application No. 2016-139307 filed on Jul. 14, 2016, and U.S. application Ser. No. 15/222,271 filed on Jul. 28, 2016. The entire contents thereof are incorporated in the present specification by reference.

BACKGROUND OF THE INVENTION

1. Field of the Invention

The present invention relates to a mobile terminal such as a feature phone, smartphone, and tablet, etc. with a call function that enables data communication and calling, or a texting function.

2. Description of the Related Art

In the recent years, smartphones have become popular with a wide range of people from children to the elderly, due to a large amount of information to be displayed as compared to feature phones, the spread of user-friendly applications, and easy character input by screen touch operations, for example, swiping, etc. Further, due to its user-friendliness, a smartphone user uses a smartphone not only as a means of conveying important matters as in the past, but as a means of laid-back communication, such as chatting and frequently sending instant messages that tweet only one's mood at that point of time. Therefore, from the standpoint of the receiving side of the smartphone user, the frequency of incoming calls that require communication, or the reception of messages such as e-mails during walking, or during movement by bicycle or car (hereinafter, appropriately called a "vehicle") has increased significantly.

Further, in order not to displease the sender, the receiver tries to maintain the continuity of communication. Therefore, every time a call is received, the receiver tends to immediately answer the call, or reply to an e-mail. That is, the receiver operates the smartphone even during walking, or during movement by bicycle or car. Therefore, as a result of using smartphones during movement, the frequency of occurrence of a collision between pedestrians and between a pedestrian and vehicle, and a collision accident between vehicles, and derailing has also increased. The present invention focuses on the point that the continuity of communication takes effect passively, as the truth of human beings, and forces the user of the mobile terminal to continue with a call or game during movement, or create a reply e-mail and texting document. As a prior application made with a purpose of restricting the use of a cell phone while walking, an application is present in the Japanese Unexamined Patent Application Publication No. 2003-298690; however, the application attempts to restrict an operation during walking, and did not restrict the passive reaction of a user to a contact via an e-mail received from a third person and SNS (Social Networking Service) as described above, a call, or a game scenario having interactive elements and executed by a controller of the mobile terminal on the basis of a game program.

Such problems have become social problems, such as problems affecting human lives, particularly in countries where the means of transportation has developed and thoroughfares are packed with people, for example, a person may lose footing and fall on a railway track, which leads to the delay of the transportation by causing trains to stop, or a collision between bicycles.

Further, as another usage, smartphones are used as social games.

It is noted that a method and system of restricting calling during movement by vehicle have been proposed and implemented in cell phones (feature phones) prior to the launch of smartphones. For example, if a call is received on the cell phone of the driver or a fellow passenger during movement by vehicle, the location is measured twice, that is, at the time of receiving a call and after the lapse of a predetermined time (after five seconds) by a GPS (Global positioning system). The distance traveled and the movement speed is calculated from the measurement result, and it is determined whether or not the receiver is moving by vehicle. If the determination result indicates that the receiver is moving, the incoming call is ended after the cell phone has rung only for a predetermined time, and the receiver is thus prevented from taking the call (see Japanese Unexamined Patent Application Publication No. 2007-19674).

However, according to the conventional method and system, it is feared that if an incoming call is notified by a ring during the movement by vehicle, the driver may operate the mobile terminal either while moving or by bringing the vehicle to a sudden stop in order to maintain the continuity of communication.

Further, it is also possible to set the cell phone to a non-ringing mode, by a manual operation, before moving by vehicle, but the incoming call history is retained on the screen. Therefore, even if the cell phone does not ring, a person who frequently uses the e-mail, chat function etc. may constantly check the incoming call history displayed on the screen of the cell phone, and thus there is a possibility to lose the safety during movement.

In addition, if such a system is set in the cell phone by default, it could result in inconvenience whereby calling and operation of the cell phone of fellow passengers other than the driver would also be restricted.

Further, in the method described in the Japanese Unexamined Patent Application Publication No. 2007-19674 specified above, the use of the GPS, depending on the precision of the GPS, may cause another technical problem that it is extremely difficult to be able to accurately detect the movement within a period of five seconds, in the case of movement accompanied by walking or vehicles that move slowly such as bicycles. Such a system may be useful when moving in the Shinkansen, cars, bikes, or buses.

In addition, there is a problem that, when playing a game on the smartphone, the end time of the game and the timing when the user needs to move do not match, or they are difficult to be matched, and thus, even though the user of the cell phone remains stationary and plays a game, if the user faces a situation where the user has to move before the end of the game, the user had no choice but to move while playing the game.

The present invention has been achieved in view of the above-described problems, and an object thereof is to provide a mobile terminal with a call function or a texting function by which it is possible to prevent an owner of the mobile terminal from using, by a manual operation, the mobile terminal during the movement. With a method of using GPS for a maximum movement speed of 20 km/h or less, such as in the case of walking or riding a bicycle, it is difficult to instantly determine whether the mobile terminal is moving, and thus, the present invention particularly relates to a mobile terminal with a call function or a texting function that is suitable for such movement and a program of a cell phone that is controlled in cooperation with the function of the cell phone.

SUMMARY OF THE INVENTION

The present invention provides a mobile terminal with a call function or a texting function, or a function as a game terminal, and a game program and a game method executed by downloading to the mobile terminal.

A mobile terminal that is capable of performing data communication and calling, comprising:

a first communication means of calling and exchanging data;

a display means of displaying various types of information;

a notification means of notifying an incoming call;

a movement information acquisition means of acquiring information indicating movement of the mobile terminal;

a movement determination means of determining whether or not the mobile terminal is moving on the basis of information acquired by the movement information acquisition means; and a control means of setting a display of an incoming call or reception information indicating an incoming call or reception in a non-displayed manner on the display means, when the mobile terminal is determined to be moving by the movement determination means.

According to the present configuration, information indicating the movement of the mobile terminal (for example, a location, distance traveled, movement speed, and acceleration, etc.) is acquired by the movement information acquisition means, and whether or not the mobile terminal is moving is determined on the basis of the information by the movement determination means. If the determination result indicates that the mobile terminal is moving, the incoming call information is not displayed on the display means, and at the same time, the notification of the notification means is set to invalid. That is, if there is an incoming call or reception by the mobile terminal during movement in this state, a notification (for example, a notification sound, vibration, and lighting of an LED, etc.) indicating an incoming call that requires communication, and the reception of character data, such as an e-mail, is not made, and there is no display of any incoming call history on the screen of the display means, such as a display indicating an incoming call or reception in progress, and characters and patterns indicating an incoming call. Therefore, the owner of the mobile terminal at the reception side (the receiver) is capable of moving safely without being distracted by incoming calls or reception by the mobile terminal during the movement.

Further, in the above-described configuration, it is preferable that when there is an incoming call to a mobile terminal that is determined to be in movement by the movement determination means, the control means automatically returns, to a transmission-side terminal, a message indicating that the mobile terminal is in movement through an automated voice or e-mail.

According to the present configuration, since a message (for example, an e-mail or a voice message) indicating the inability to take a call is automatically sent to the transmission-side terminal by the control means of the reception-side mobile terminal, the sender is capable of knowing that the receiver is moving and thus in a state in which the receiver is not capable of operating the mobile terminal. Therefore, the sender does not repeat the sending operation until a call is received at the reception-side mobile terminal, or until a reply to the e-mail is received, because of which the receiver is capable of moving safely without being concerned about the incoming calls to the mobile terminal.

Further, in the above-described configuration, the movement determination means compares the movement speed determined from the movement information and the predetermined standard speed, and determines whether or not the movement speed is equal to or below the standard speed, and when the movement speed becomes equal to or below the standard speed, the control means calculates the movement time at the standard speed or below, and when the actual calculated period exceeds the set time period, the control means preferably cancels the non-displayed setting of the incoming call information on the display means and the invalid setting of a notification by the notification means.

According to the present configuration, for example, when the owner of the mobile terminal starts moving on foot after stopping from high-speed movement by vehicle or getting off the vehicle, the non-displayed setting on the display means and the invalid setting of the notification are canceled automatically. Therefore, the owner need not cancel the invalid setting by a manual operation.

Further, in the above-described configuration, a storage means of storing the reception information received during an incoming call is provided, and when the control means cancels the non-displayed setting of the incoming call information on the display means and the invalid setting of a notification, the control means preferably displays information, on the display means, indicating that there was an incoming call during movement on the basis of the incoming call information stored in the storage means.

According to the present configuration, when the invalid setting is canceled and the mobile terminal becomes possible to be used as usual, the owner is capable of knowing that there was an incoming call during movement from the incoming call information (for example, characters or patterns) displayed on the screen of the display means. Therefore, the receiver is capable of immediately replying to the sender.

Moreover, in the above-described configuration, the mobile terminal further comprising:

a second communication means of performing radio communication with a designated sending and receiving means, the control means connects to the sending and receiving means designated via the second communication means, and when a connection with the sending and receiving means is detected, the control means preferably cancels non-displayed setting of incoming call information on the display means, and invalid setting.

According to the present configuration, the sending and receiving means designated via the second communication means, for example, a microphone and a speaker function are comprised, and when an owner uses a headset by which handsfree calling is enabled, and onboard handsfree through a car audio or a car navigation system, it is possible to effectively use a voice call and voice input that do not require the direct manual operation of the mobile terminal.

Further, in the above-described configuration, it is preferable that when the control means detects a connection with the sending and receiving means via the second communication means, the control means cancels the non-displayed of the incoming call or reception information on the display means, and thereafter, sends, by the first communication means, to another mobile terminal, cancellation information for canceling the non-displayed setting on the display means.

For example, the terminal means for enabling a handsfree calling is generally restricted to a connection with a mobile terminal designated through a short-range radio, for example Bluetooth (registered trademark), and thus, as for the other mobile terminals possessed by the fellow passengers of the vehicle, incoming call display on the display means is set to non-displayed and at the same time, the notification is set to invalid. However, according to the present configuration, since the cancellation information (a cancellation key) is sent from the mobile terminal connected to the sending and receiving means to the other mobile terminal of a fellow passenger, by entering the received cancellation information to the other mobile terminal, no restriction is applied to the use of the mobile terminal of the fellow passenger even during movement by vehicle, and it is possible to use the mobile terminal of the fellow passenger as usual.

In addition, in the above-described configuration, a third communication means of exchanging data, by radio, with another mobile terminal that exists in a predetermined range, is provided and the control means preferably sends, to the other mobile terminal that is connectable through the third communication means, cancellation information for canceling the non-displayed setting on the display means, and the invalid setting of a notification.

According to the present configuration, when the mobile terminal possessed by a fellow passenger has the third communication means (for example, a wireless LAN), an automatic interconnection is possible to be established with a plurality of mobile terminals (Passing-by communication), and the cancellation information is sent automatically, by the radio, from the mobile terminal of the driver that is connected to the sending and receiving means, to the mobile terminal of another fellow passenger. Therefore, by entering the cancellation information into the other mobile terminal, no restriction is applied to the use of the mobile terminal of the fellow passenger even during movement by vehicle, and it is possible to use the mobile terminal of the fellow passenger as usual.

Further, an invention described below is provided.

A mobile terminal having a call function or a texting function, comprising: a first communication means of calling or exchanging message data, a display means of displaying various types of information;

a notification means of notifying an incoming call;

a movement information acquisition means of acquiring information indicating movement of the mobile terminal;

a movement determination means of determining whether or not the mobile terminal is moving on the basis of information acquired by the movement information acquisition means; and a control means of setting a display of incoming call information indicating an incoming call in a non-displayed manner on the display means, when the mobile terminal is determined to be moving by the movement determination means.

In addition, an invention described below is provided.

It is possible to provide the mobile terminal with a call function and a texting function according to claim 1, such that a plurality of categories are set beforehand depending on a movement speed of the mobile terminal in movement, and the control means makes an invalid setting for a function for making different invalid settings depending on a category that is stored in accordance with the category corresponding to a movement speed determined by the movement determination means and that includes the function for displaying.

In this case, the invalid setting is made in accordance with the movement speed, and therefore, the control means is capable of controlling different settings depending on an influence on the surroundings and a risk while preventing obstruction to the convenience of the user. It is possible to avoid problems such as becoming not able to use the mobile terminal in Shinkansen, where using the mobile terminal is not a problem, due to invalidation of a uniform function since the mobile terminal is in movement. When restricting a game operation, texting, or calling during walking, it is necessary to ensure that the user is not capable of changing the function for making invalid setting as described in the present invention. In such a case, the present invention is further capable of restricting the function for making invalid setting for each movement speed, and thus, the present invention becomes more useful.

According to the mobile terminal of the present invention, it is possible to restrict a trigger by which the user of the mobile terminal ends up passively operating the mobile terminal due to a desire to use the mobile terminal, and as a result, it is possible to prevent the use of the mobile terminal by a manual operation because of an incoming call during movement.

Further, the present invention also provides an invention described below.

(A) A game program executed on a mobile terminal with a call function or a texting function, and a function capable of executing a game, comprising:

a communication means of calling or exchanging message data;

a display means of displaying various types of information;

a notification means of notifying an incoming call;

a movement information acquisition means of acquiring information indicating movement of the mobile terminal;

a movement determination means of determining whether or not the mobile terminal is moving on the basis of information acquired by the movement information acquisition means;

an operation means of executing a game;

a storage means of housing the game program; and a control means of storing game history information related to a game screen that is executed by a game program housed in the storage means, and at the same time, prohibiting an update of a display or setting the update in a non-displayed manner on the display means of the game that is executed by the game program, when the mobile terminal is determined to be moving by the movement determination means, such that the game program is controlled by the control means, and by executing the game program on the control means, the processes described below are executed.

A process of generating a game screen for displaying on the display means, and a process of generating game history information related to a game screen that is executed by a game program housed in the storage means for storing in the storage means, when the mobile terminal is determined to be moving by the movement determination means.

(B) A game method that executes programs such as a program that is pre-installed or a game program that is downloaded in a mobile terminal with a call function or a texting function, and a function capable of executing a game, comprising:

a process of downloading the game program by a communication means that performs calling or exchange of message data of the mobile terminal;

a process of executing the downloaded game program by a control means, and displaying, on a display means connected to the control means, various types of game screens, the game screens are information for prompting further operation by an operation means; and a process of acquiring information indicating movement of the mobile terminal, and when the mobile terminal is determined to be moving on the basis of a result of determining whether or not the mobile terminal is moving, prohibiting an update or setting the update to be non-displayed on a game screen for displaying on the display means, while storing game history information related to the game screen. A process of generating game history information related to a game screen that is executed by a game program housed in the storage means for storing in the storage means, when the mobile terminal is determined to be moving by the movement determination means.

The game history information is automatic backup data for enabling a game to be played in continuity when the game is played the next time due to the fact that the display of the game screen prompting further game input on the display screen was either not updated or not displayed as a result of detection of movement.

Further, an invention described below is provided.

In a game program included in a mobile terminal, the mobile terminal comprises:

a communication means;

a display means of displaying various types of information;

a mobile information acquisition means of acquiring information indicating movement of the mobile terminal;

a movement determination means of determining whether or not the mobile terminal is moving and is changing in movement speed on the basis of the information that is acquired by the movement information acquisition means;

an operation means for executing a game;

a storage means; and a control means of controlling each of the means, and the game program, while being stored in the storage means, causes the control means of the mobile terminal to execute the following process:

a process of, when the mobile terminal is determined to be moving by the movement determination means, according to any one of a plurality of categories to which the preset movement speed of the mobile terminal belongs, prohibiting or setting and restricting in a non-display manner, an update of a display of a game screen employing display data that is generated by the game program and prompts an input of a game.

In addition, in the invention, the plurality of categories include: a first speed having a predetermined speed; and a second speed that is higher than the first speed, and the game program executes the following processes:

a process of restricting the update of the game screen when the movement speed of the mobile terminal is determined to be the first speed; and a process of releasing control which restricts the update of the game screen so that the game can be executed even while in movement when the movement speed of the mobile terminal is determined to be the second speed.

Further, a game control method of executing a program such as a program that is pre-installed or a game program that is downloaded in a mobile terminal with a call function or a texting function, and a function capable of an executing a game, comprises the following processes:

a process of downloading the game program by a communication means of calling or exchanging message data, of the mobile terminal;

a process of executing the downloaded game program by the control means, and according to a game operation exerted by the operation means that is connected to the control means, causing the display means that is connected to the control means to display a variety of game screens, information prompting a further operation exerted by the operation means; and a process of acquiring information indicating movement of the mobile terminal, determining whether or not the mobile terminal is moving, and according to any one of the preset categories to which the movement speed of the mobile terminal belongs, prohibiting or setting and restricting in a non-display manner, an update of a display of the game screen employing display data that is generated by the game program and prompts an input of a game.

The game control method as described above is characterized in that the plurality of categories include: a first speed having a predetermined speed; and a second speed that is higher than the first speed, and the control means restricts the update of the game screen when the movement speed of the mobile terminal is determined to be the first speed, and releases control which restricts the update of the game screen so that the game can be executed even while in movement when the movement speed of the mobile terminal is determined to be the second speed.

In still another modification example, as an appropriate measure for disallowing the play of a game while in movement, unless the mobile terminal stops or is at a movement speed that is substantially approximate to the stopped state, awarding of a more advantageous point is disallowed in a game that is awarded according to a game result, or alternatively, a lower point is merely allowed to be awarded even if the same game result is obtained, thereby making it possible to restrict the play of the game while in movement.

More specifically, the following configuration is provided.

That is, in a game program executed by a control unit of a mobile terminal, the mobile terminal comprises:

a communication unit;

a display unit of displaying various types of information;

a movement information reception unit of acquiring information indicating movement of the mobile terminal;

a movement determination unit of determining whether or not the mobile terminal is moving and is changing in movement speed on the basis of the information that is acquired by the movement information reception unit; an operation unit for executing a game;

an operation unit for executing a game a storage unit; and a control unit of controlling each of the units, and the game program, while being stored in the storage unit, causes the control unit of the mobile terminal to execute the following processes:

a process of, when the mobile terminal is determined to be moving by the movement determination unit, setting point data according to the determined movement speed, the point data being stored so as to be associated with each of the preset movement speeds of the mobile terminal; and a process of employing items of point data that are different from each other according to the movement speed to thereby execute point awarding according to a result obtained after display data that is generated by the game program and prompts an input of a game is displayed, and the game is then input by employing the operation unit.

DETAILED DESCRIPTION OF THE EMBODIMENTS

Figure 1:
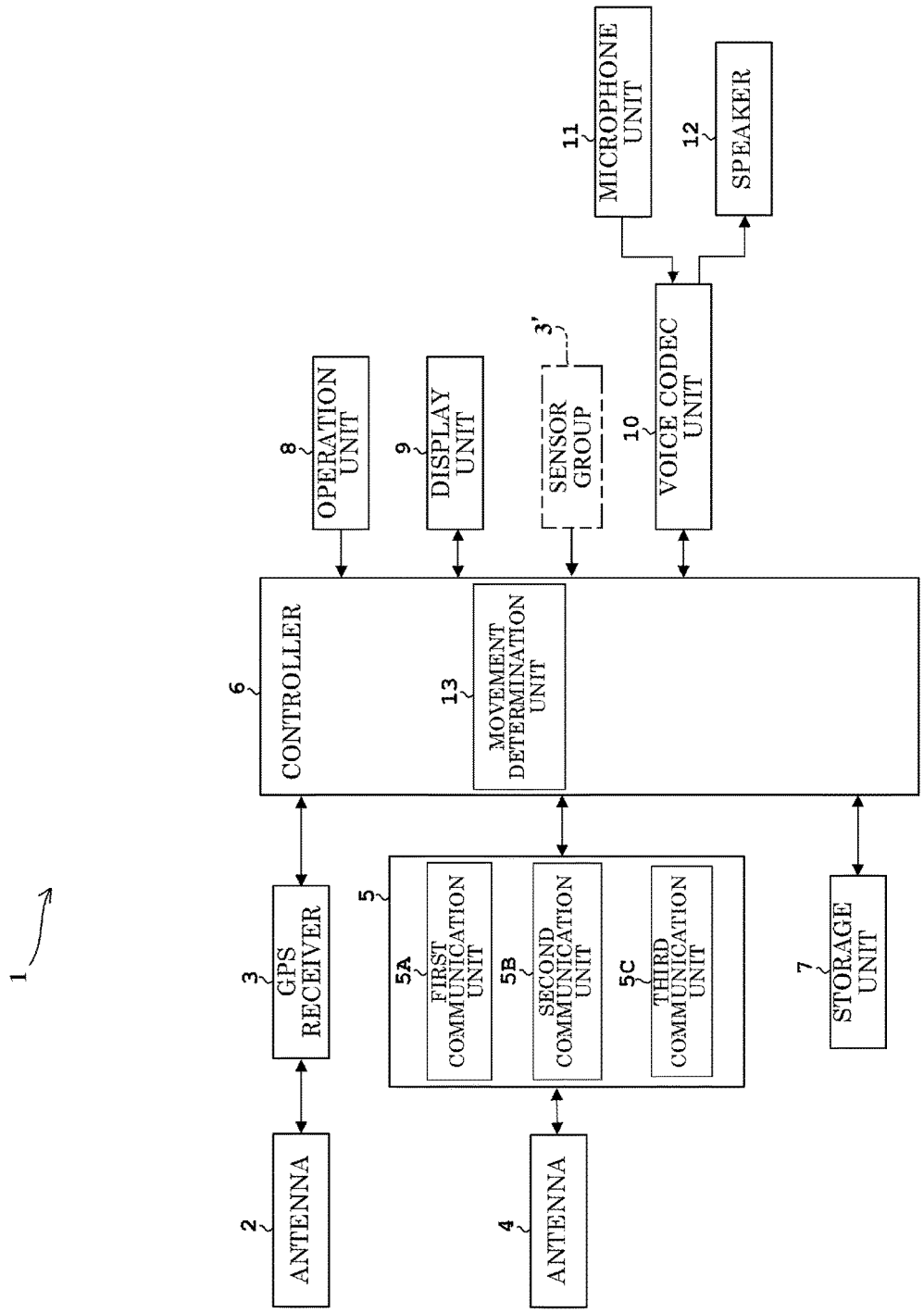
FIG. 1 is a block diagram showing a configuration of a mobile terminal according to the present invention.

Hereinafter, an embodiment of the present invention will be described in detail with reference to the accompanying drawings. It is noted that in the drawings according to the present embodiment, description is provided by using a smartphone as an example of a mobile terminal; however, the mobile terminal of the present invention is not limited to a smartphone, and includes, for example, a feature phone and a tablet, or the like, as long as calling and exchange of data are available.

FIG. 1 is a block diagram showing one embodiment of the mobile terminal.

A mobile terminal 1 is configured by an antenna 2, a GPS receiver 3, an antenna 4, a communication unit 5, a controller 6, a storage unit 7, an operation unit 8, a display unit 9, a voice codec unit 10, a speaker 12, a microphone unit 11, and the like. In addition, the controller 6 comprises a movement determination unit 13. Hereinafter, each configuration will be described in detail. Further, a clock unit that is not shown in the figure is connected to the controller 6. It is preferable that the clock unit generally uses a crystal oscillator. The operation unit 8 is used to enter a telephone number, enter a call button, and perform character input for creating an e-mail or the like for performing texting.

The GPS receiver 3 acquires location information from a GPS radio wave received by the antenna 2. The location information is information about the latitude and the longitude that is sent through the GPS radio wave from a GPS satellite 20 shown in FIG. 2. The GPS receiver 3 acquires the location information on the basis of an instruction by the controller 6. It is noted that the GPS receiver 3 corresponds to the movement information acquisition means of the present invention.

Figure 2:
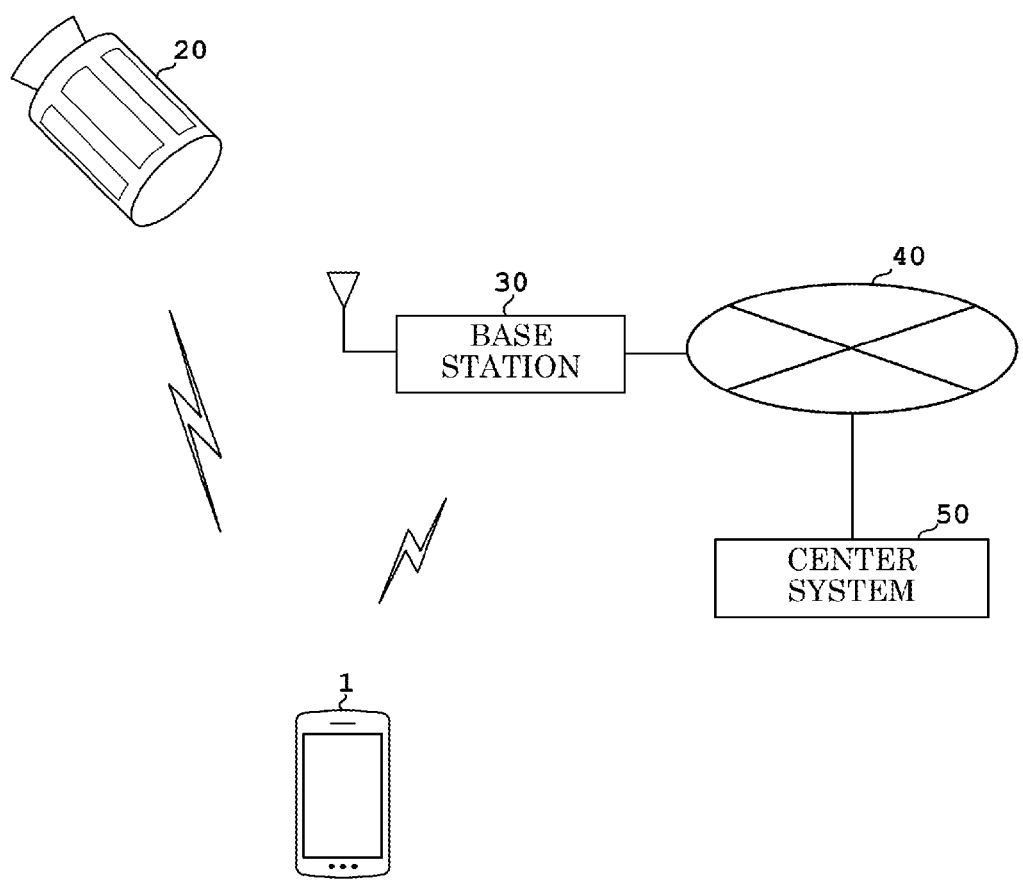
FIG. 2 is a schematic diagram showing a communication mode of the mobile terminal according to the present invention.

The communication unit 5 is configured by a first communication unit 5A, a second communication unit 5B, and a third communication unit 5C. As shown in FIG. 2, the first communication unit 5A selects a signal frequency received from a base station 30 of a contract communications carrier, amplifies the frequency by performing frequency conversion, and demodulates and outputs the reception data to the controller 6. In addition, the first communication unit 5A modulates the transmission data output from the controller 6, amplifies the data as a carrier wave of a specified frequency, and then sends the data from the antenna 4. That is, the mobile terminal 1 according to the present embodiment is configured to perform communication with the base station 30 via the first communication unit 5A and the antenna 4 through the control of the controller 6.

The second communication unit 5B enables intercommunication with various types of terminals including a mobile terminal with the second communication unit 5B of the same specification through short-range radio. Examples of the second communication unit 5B include, for example, units such as Bluetooth (registered trademark), IrDA, etc. Further, each terminal that is connected according to the present embodiment includes, for example, a headset by which handsfree calling is enabled, and onboard handsfree through a car audio or a car navigation system. It is noted that these terminals correspond to the sending and receiving means of the present invention.

The third communication unit 5C has a longer communication distance than the second communication unit 5B, and is configured by a wireless LAN module, etc. that performs wireless LAN communication with another mobile terminal and an access point of a wireless LAN.

It is noted that the first communication unit 5A, the second communication unit 5B, and the third communication unit 5C respectively correspond to the first communication means, the second communication means, and the third communication means of the present invention.

The controller 6 executes general controls related to the mobile terminal 1, for example, voice processing, data exchange processing, input-related processing, display processing, and invalid setting processing of a specific function.

The voice processing processes the reception data output from the first communication unit 5A, and outputs a voice signal to the voice codec unit 10. Further, the controller 6 converts the voice signal output from the voice codec unit 10 to transmission data, and outputs the transmission data to the first communication unit 5A.

The data exchange processing executes various programs (applications) such as e-mails, chats, instant messages, the Internet, etc., and displays data that is received automatically and stored in a storage unit, and also performs data conversion and transmission of the entered character data, such as e-mails.

The input-related processing sends, to each unit, various commands based on the input information from the operation unit 8 made of physical keys such as a home key that is used to return to a home screen of an application, a volume button, and a power button, etc., and a display unit 9 having a function of a touch panel.

The display processing performs the display of information displayed on the display unit 9, such as the display of the OS (Operating System) and the display of applications.

It is noted that the processing for making an invalid setting for a specific function in the controller 6 will be described in detail later in the description of an operation.

The movement determination unit 13 determines the movement start and the movement stop of the mobile terminal 1. In other words, the movement determination unit 13 determines whether or not the mobile terminal 1 is in movement. In the present example, by using the clock unit, the location information that is acquired sequentially by the GPS receiver 3 is temporarily stored in a predetermined region of the storage unit 7 either sequentially or at a predetermined time interval, the location information is read in each predetermined time interval, a distance between two points is determined from the location coordinates included in the location information, and moreover, the actual movement speed is determined from the distance and the movement time between the two points. In addition, in the present example, a standard speed that is stored beforehand in the storage unit 7 by categorizing into movement speeds in accordance with moving objects, and the actual movement speed are compared by the movement determination unit 13, and the moving object is specified.

The standard speed according to the present embodiment is, for example, categorized into movements by walking, and movements by vehicles including bicycles and cars. Specifically, 18 km/h corresponds to the average speed of a bicycle. The general movement speed of a bicycle is from 16 km/h to 35 km/h. Therefore, a bicycle running at a movement speed that is equal to or faster than 18 km/h, that is, a bicycle moving at a high speed is included in cars.

The voice codec unit 10 converts the voice signal output from the controller 6 to an analog signal, and outputs voice from the speaker 11. Further, the voice codec unit 10 performs A/D conversion of the voice input from the microphone unit 12 to a PCM signal, and outputs the same to the controller 6.

Figure 3:
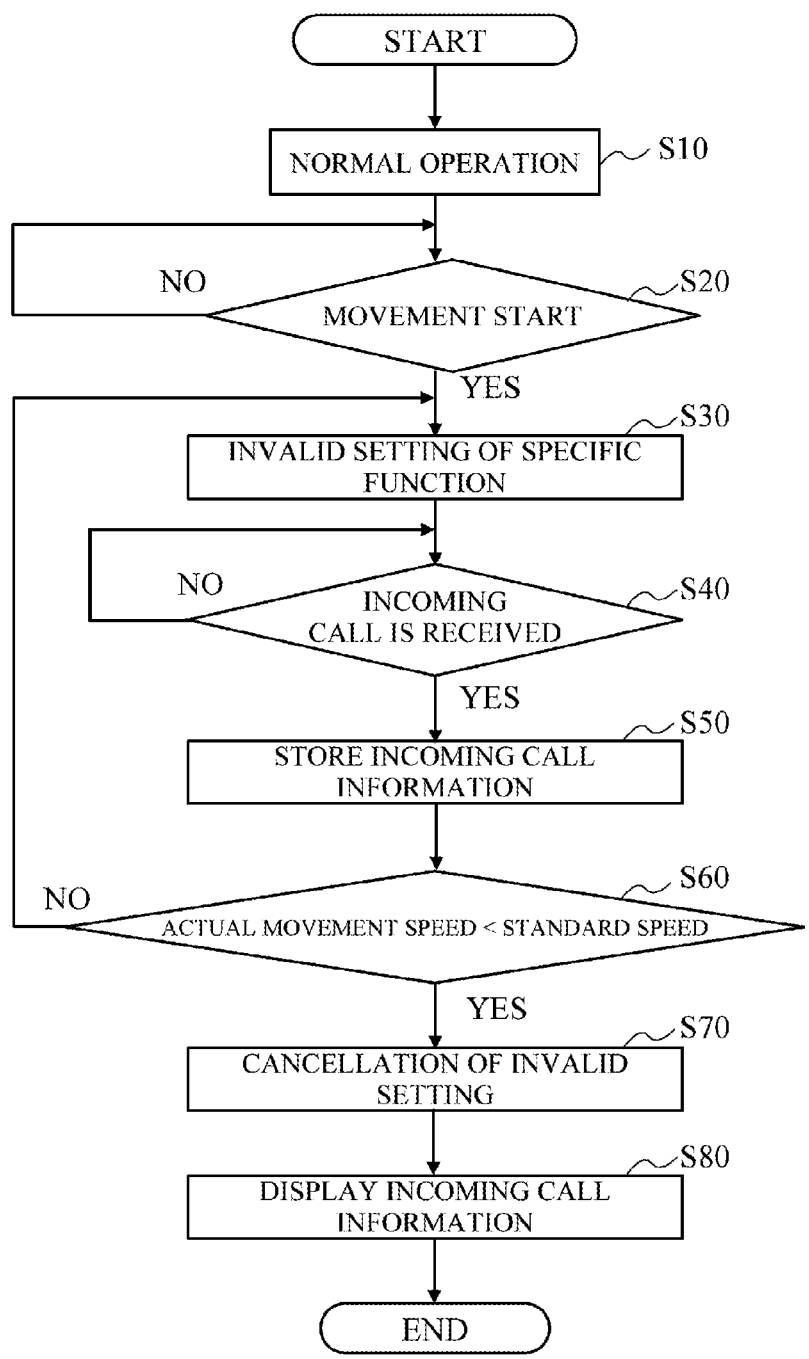
FIG. 3 is a flowchart showing an operation of the mobile terminal in movement according to the present invention.

Next, the processing for making an invalid setting for a specific function in the mobile terminal 1 will be described in detail in line with the flowchart shown in FIG. 3. It is noted that in the present embodiment, as shown in FIG. 2, the mobile terminal 1 is configured to acquire location information from the GPS satellite 20, and also to be capable of connecting to a center system 50 via the base station 30 and a public network 40. Further, in the present embodiment, the description is provided for a case, as an example, in which all functions of the mobile terminal 1 are possible to be used in a stopped state and while walking; however, an invalid setting may be made for the use of a specific function by considering walking as movement.

First of all, the mobile terminal 1 is considered to be in a state in which a high-speed movement is not performed, and all functions are possible to be used (step S10). That is, the mobile terminal 1 is in a state capable of notifying an incoming call through a ringtone for an e-mail or call by the speaker, or through vibration of the vibrator. Further, the mobile terminal 1 is in a state capable of displaying and entering information on the display unit 9.

The controller 6 sequentially receives the location information by the GPS receiver 3, and temporarily stores the information in a predetermined region of the storage unit 7. Further, the movement determination unit 13 reads the location information during reception and the location information five seconds before the reception, from the storage unit 7, at a predetermined time interval (for example, five seconds), and determines whether or not the mobile terminal 1 will start moving (step S20). That is, the movement determination unit 13 determines the distance between two points from the location information (the location coordinates) of two sites, and then determines the actual movement speed from the distance and the movement time. Once the actual movement speed is determined, the movement determination unit 13 refers to the category table of the standard speed that is stored in the storage unit 7, and determines the category to which the actual movement speed belongs.

When the determination result belongs to the category of being stopped or during walking, and high-speed movement has not started, the processing of step S20 is repeated. When it is determined according to the determination result that a high-speed movement has started, a specific function of the mobile terminal 1 is set to an invalid setting (step S30). That is, the controller 6 sets the notification function to invalid, and at the same time, sets some of the display functions to invalid. Specifically, the controller 6 sets these notification functions by the ringtone for an e-mail or call, or by the vibration of the vibrator, to invalid. Further, non-displayed setting is made by which the incoming call history due to the receipt of calls, and the display indicating the reception of an e-mail are not displayed at all on the screen of the display unit 9. That is, the display unit 9 displays the screen of the initial state or the screen at the time of the final operation. In the category table of the standard speed, each of the functions for making an invalid setting corresponding to each category (a category corresponding to different speeds, such as a low-speed movement during walking, or a high-speed movement corresponding to the movement by car, or a super high-speed movement corresponding to the Shinkansen, etc.) is associated in a different manner. As a result, it is possible to individually change a function to make an invalid setting during walking and a function to set an invalid setting during a high-speed movement. For example, in cases where 18 km/h to 200 km/h or below is considered as the high-speed movement, all functions are set to invalid, such as invalidation of the display function and invalidation of the notification function as described above, or in some circumstances, all functions are stopped by invalidating the power supply; however, in cases where a person is assumed to be inside a Shinkansen train moving at a super high-speed of 200 km/h or more, all functions except the notification function by voice are set to a non-invalid setting. This is because normally, a car does not run at a speed of 200 km/h or more, and if tentatively, a car is assumed to run at a speed of 200 km/h on Autobahn, etc., a person is not expected to perform input operations of the situation of the phone during such a super high-speed movement, and the possibility of making calls, creating e-mails, and playing games inside a Shinkansen train match the desire of the user. That is, rather than setting the same functions to invalid for all kinds of movement, by adopting a configuration that is set by a table data in which the functions to be set invalid depending on the movement speed are stored beforehand, the control means makes an invalid setting for the functions to be set invalid that are associated with each of a plurality of categories categorized depending on the movement speed.

The functions to be invalid as described above also include cutting off the power, that is, the invalid setting for invalidating the power supply. In the present invention, when all functions as the mobile terminal are set to be invalid tentatively, it is advantageous to make the invalid setting for the power by turning OFF the power source even from the viewpoint of saving the battery.

In addition, as an above-described invalid setting, it is also possible to have a configuration in which the antenna function is set to invalid. In this case, the situation is the same as when the function of receiving a call and receiving an e-mail are automatically set to invalid, but it is possible to make preparations for sending an e-mail. Thus, as long as the operation unit 8, which is an input means such as a touch panel, is not used actively, problems such as those described in section of the problems of the present invention do not occur. Here, the indirect and passive triggers that compel the user to use the mobile terminal 1 are assumed to be the reception of an e-mail, and being forced to reply upon being contacted by a third person to communicate over an SNS. And as for the above-described triggers, since the function for the action of whether or not to receive a call is set to invalid, no problem occurs as long as the user himself/herself does not actively use the mobile terminal.

Next, the controller 6 monitors whether or not an incoming call or an e-mail is received when a specific function has been set to invalid (step S40). When no incoming call or an e-mail is received, the controller 6 repeats the processing of step S40, and monitors the existence of an incoming call or e-mail. When an incoming call or an e-mail is received, the controller 6 stores the incoming call information in the storage unit 7 (step S50). That is, all the incoming call information are stored in the storage unit 17, that are displayed on the display unit 9 when the mobile terminal 1 is available for normal use. The incoming call information is general information, including a cell phone number, e-mail address, and a number, etc. indicating the number of received incoming calls or e-mails received to be indicated on an icon for activating the application for calls or e-mails. The entire incoming call information is stored in the storage unit 7, and is not displayed on the display unit 9 when a movement is determined.

While such a state is retained, the movement determination unit 13 continues to monitor whether the mobile terminal 1 is in a high-speed movement by bicycle or by car, or whether or not the high-speed movement has stopped (step S60). That is, same as the determination of movement start, the movement determination unit 13 determines whether or not the mobile terminal 1 is moving by determining the actual movement speed of the mobile terminal 1 at a predetermined interval. That is, when the actual movement speed is less than the standard speed, and the predetermined time that has been decided beforehand has elapsed, the movement determination unit 13 assumes that the mobile terminal 1 is stopped or during walking, and thus, determines that the movement is stopped. When the actual movement speed is equal to or more than the standard value, the movement determination unit 13 determines the mobile terminal 1 is in movement.

Here, the movement determination unit 13 calculates the speed of movement, but what is important in the present invention is that firstly detecting the state of movement by using a sensor such as an acceleration sensor 3', etc. described later, and secondly categorizing the movement depending on the movement speed, and applying a restriction of an invalid setting in accordance with the category. For example, according to the present invention, as far as the categories are concerned, when the movement is categorized into a speed at which the owner himself/herself is operating a bicycle, or walking (category 1), a strict invalid setting is made (a state in which all functions that would be operated by the user are set to invalid, such as automatically turning OFF the power, etc. in some circumstances), when the speed is slower than the category 1 (substantially stopped: Category 2), all functions are enabled, and when moving at a speed faster than the category 1 (traveling on a public transportation means or driving a car, etc.), some functions are set to invalid as a less strict invalid setting compared to the category 1.

When the movement determination unit 13 determines that the movement has stopped, the controller 6 cancels the invalid setting (step S70). That is, the controller 6 enables the use of all the usual functions. In addition, the controller 6 displays the incoming call information, that is prohibited to be displayed on the display unit 9 due to the invalid setting and is stored in the storage unit 7, on the display unit 9 as usual. For example, the number indicating the number of received incoming calls or e-mails is superimposed and displayed on the icon for calls and e-mails. By clicking such icons, each application is activated, and thereby it is possible to check the cell phone number of the incoming call and contents of the e-mail. The series of processing thus ends.

Further, a game program capable of executing a social network game is housed in the storage unit 7. Such a storage unit 7 may be a game program that is downloaded via an Internet environment, or may be a cartridge and a memory card. Then, when a user is playing a game by executing such a game program in the controller 6, and the movement determination unit 13 determines that the mobile terminal is moving, the controller 6 cooperates with the game program and performs control either not to display the display data that is generated by the game program on the display unit 9, or by not to update the display. In this case, in step S50, same as the case when the incoming call information is stored in the storage unit 7, the game history in a state that the display related to the game is restricted is stored in the storage unit 7. Then, in step S70, when the controller 6 cancels the invalid setting, the controller 6 refers to the game history stored in the storage unit 7, and switches to the updated game display screen that had moved ahead in the invalid state, or switches to the state in which the game is possible to be executed from the state not capable of playing the game due to the invalid state. Such an updated game screen includes images in which characters using digital images are synthetically displayed by using the AR (Augmented Reality) technology that is superimposed on the photographing screen in conjunction with the camera.

According to the mobile terminal 1 of the present configuration, when the mobile terminal 1 is moving at a high speed by vehicle, the incoming call information is set to non-displayed on the display unit 9, and the notification function is set to invalid, and as a result, there is no notification indicating an incoming call that requires communication, or indicating the reception of character data such as an e-mail, and the incoming call history, such as characters and patterns that indicate an incoming call or e-mail, is not displayed on the screen at all. By intentionally setting a specific function to invalid in such a way, the mobile terminal 1 hypothetically maintains the state of no incoming calls, and therefore, the owner of the mobile terminal at the reception side is capable of moving safely without being distracted by incoming calls or e-mails on the mobile terminal 1 during movement. Further, when a game is being executed by an operation of the operation unit 8, and a person is in a state where the person must move since a train has reached the station, by making the setting to not display or update the game screen, the person is prevented from playing the game during movement, and the reminder of a desire to play the game is prevented.

Further, since the non-displayed setting of the display unit 9 and the invalid setting of notification are canceled automatically when a high-speed movement stops, the owner need not cancel the invalid setting by a manual operation.

In addition, when the invalid setting is canceled and the mobile terminal 1 is possible to be used as usual, the owner is capable of knowing that there was an incoming call during movement from the incoming call information displayed automatically on the display unit 9. Therefore, the receiver is capable of immediately replying to the sender.

It is noted that the present invention is not limited to the configuration of the embodiment described above, and the configurations described below are also disclosed.

Figure 4:
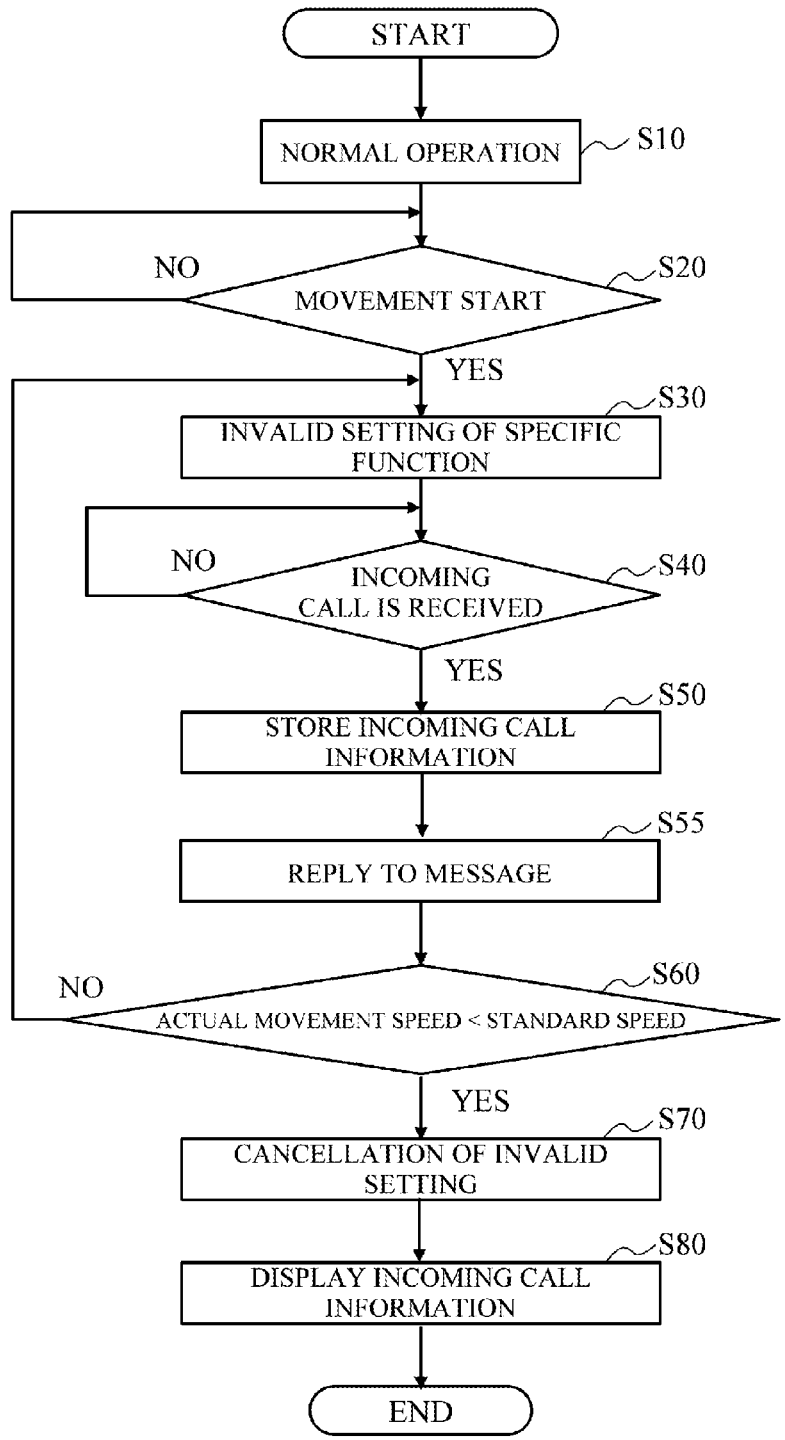
FIG. 4 is a flowchart showing an operation of the mobile terminal in movement according to a modification.

(1) The embodiment described above may be configured in a way such that when an incoming call is received by a cell phone in step S40 shown in FIG. 4, after storing the incoming call information in step S50, a message indicating the inability to take a call is sent automatically to the sender in step S55. The message may be in any form, such as voice data or an e-mail, etc. For example, the controller 6 determines whether or not the cell phone number of the sender is registered in the contact list, and if registered, the controller 6 reads the e-mail address registered in the contact list in relation with the cell phone number. In addition, the controller 6 pastes a pre-registered message in an e-mail body and sends the e-mail.

According to the present configuration, since a message indicating the inability to take a call is automatically sent to the transmission-side terminal by the controller 6 of the reception-side mobile terminal 1, the sender is capable of knowing that the receiver is moving, and is in a state not capable of operating the mobile terminal. Therefore, the sender no longer repeats the sending operation.

Figure 5:
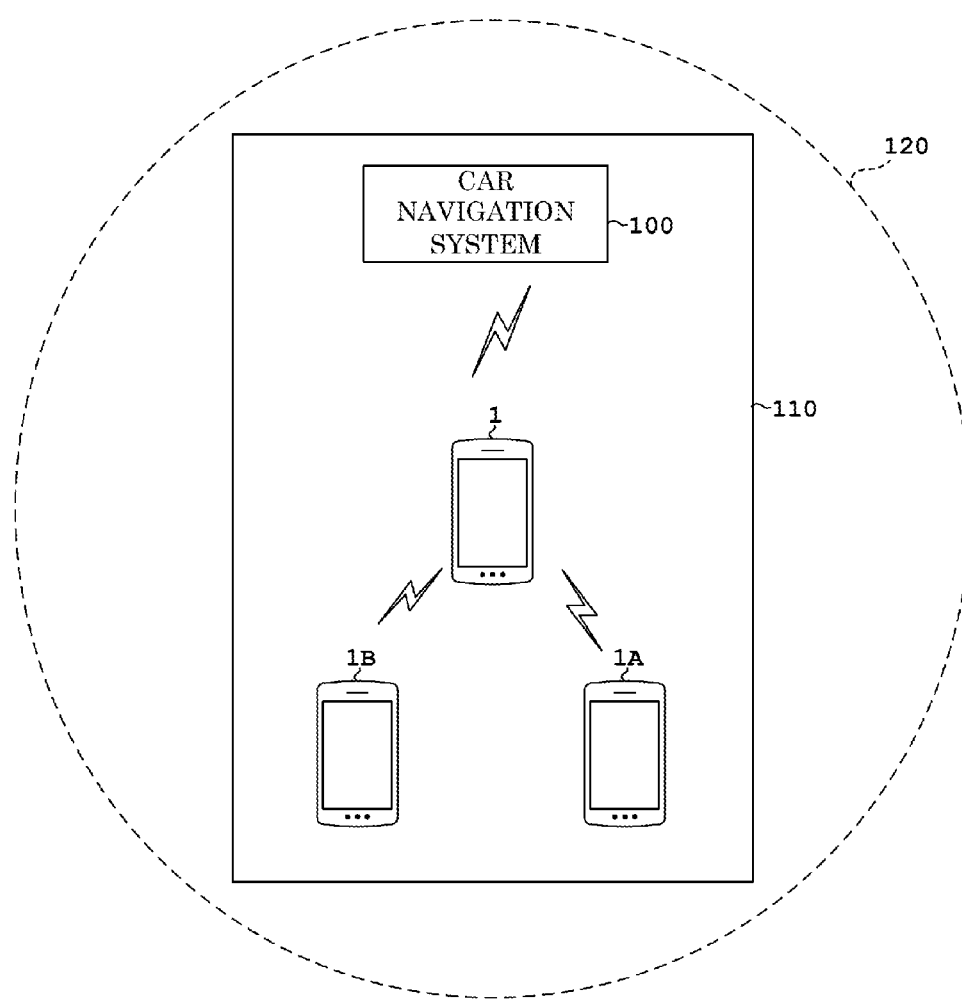
FIG. 5 is a diagram showing a connection state between mobile terminals and between the mobile terminals and a car navigation system according to the modification.

(2) The embodiment described above may be configured in a way such that if a predetermined condition is satisfied even in a high-speed movement by vehicle, the invalid setting of a specific function of the mobile terminal 1 is canceled. For example, as shown in FIG. 5, when a driver and two other fellow passengers in a vehicle 110 have a mobile terminal 1, 1A, and 1B respectively, each of the mobile terminals 1, 1A, and 1B is connectable, by the second communication unit 5B, to an onboard handsfree system loaded in the car navigation system 100.

Figure 6:
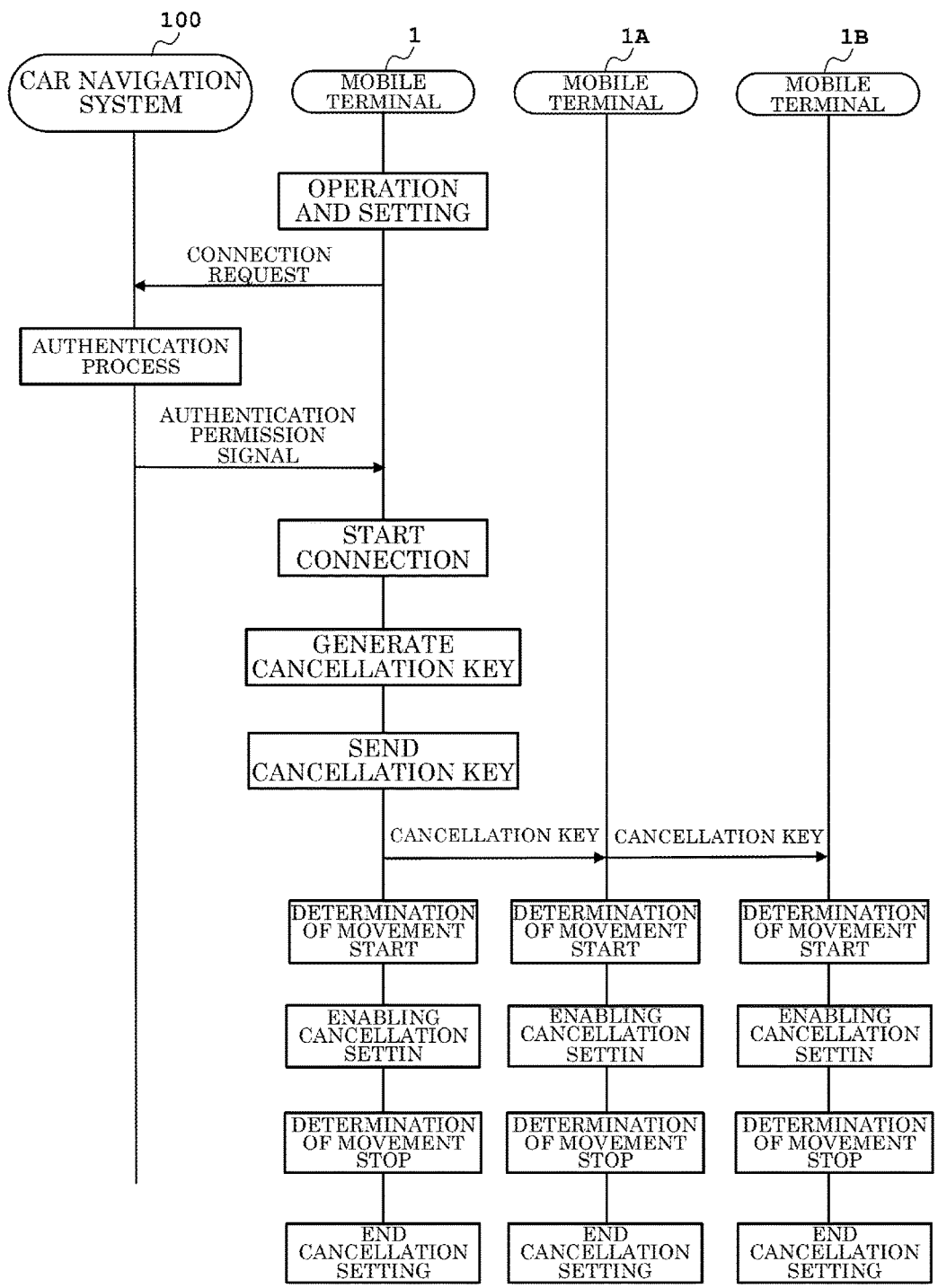
FIG. 6 is a diagram showing a setting process of an unlocking function between mobile terminals including the car navigation system according to the modification.
Figure 7:
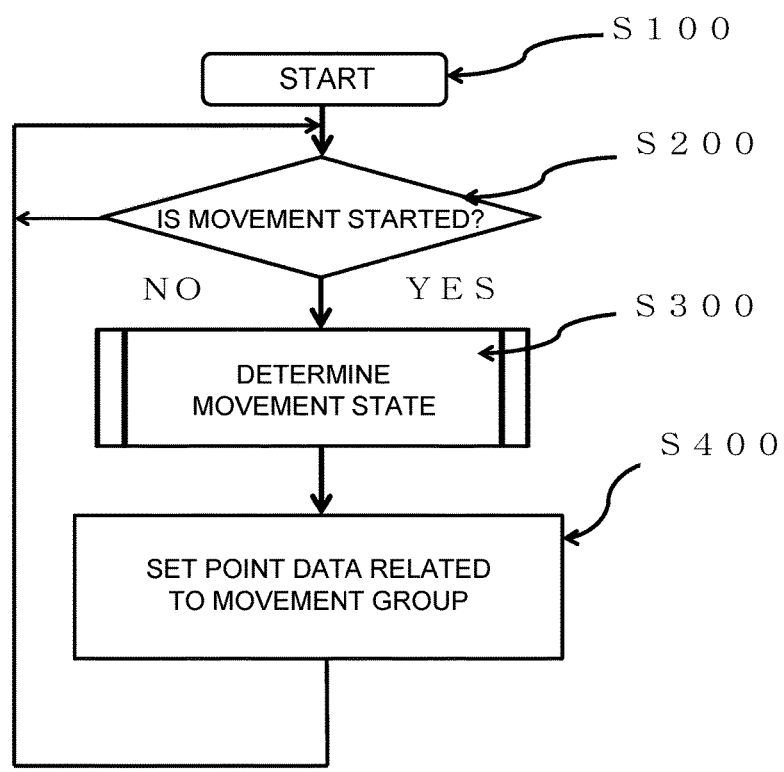
FIG. 7 is a diagram of a processing flow of awarding points that are different from each other according to a movement speed in a game of the modification example, and that are different from each other even if the same game result is obtained.

The connection to a handsfree system through a short-range radio is generally restricted to one designated terminal. Therefore, in the present embodiment, as shown in FIG. 5, a case in which the mobile terminal 1 of the driver and the car navigation system are connected will be illustrated as an example to describe in detail a configuration for canceling the invalid setting of a specific function of the in-vehicle mobile terminals 1 to 1B according to the processing flow shown in FIG. 6.

First of all, a predetermined operation and settings are made in the mobile terminal 1 of the driver, and a connection request signal including an ID for model identification is sent to the car navigation system 100. The car navigation system 100 stores, in the storage unit, a list of terminals having a short-range radio function commonly available in the market, and executes an authentication process to determine whether or not the received ID is included in the list. If the same ID is included in the list, the car navigation system 100 sends an authentication permission signal to the mobile terminal 1.

The mobile terminal 1 that is connected to the car navigation system 100 upon receiving the authentication permission signal generates cancellation information (unlock key) for canceling the invalid setting of a specific function by the controller 6. In addition, the controller 6 sends the generated cancellation key to each of the mobile terminals 1A and 1B of the fellow passengers. It is noted that the cancellation key is sent to each of the mobile terminals 1A and 1B of the fellow passengers through an e-mail by the manual operation of the owner of the mobile terminal 1. Alternatively, as shown by the dashed lines in FIG. 5, the cancellation key may be sent automatically to a mobile terminal capable of establishing a radio connection by the third communication unit 5C within a predetermined range with the mobile terminal 1 as the center (Passing-by communication).

When the unlock key is received by the mobile terminals 1A and 1B, each fellow passenger enters or copies the cancellation key to the setting screen, and starts the processing for enabling unlocking of the invalid setting of a specific function by the cancellation key. This completes the initial setting of enabling cancellation of the invalid setting of a specific function in the mobile terminals 1A and 1B of the fellow passengers.

When movement start is determined by the movement determination unit 13 within a predetermined time after the initial setting, the unlocking of the invalid setting is enabled at this time point. It is noted that together with the initial setting, the setting for not shifting to the invalid setting of a specific function may be made.

Following this, the actual movement speed is monitored by the movement determination unit 13, and when becoming in the movement stopped state and then the movement stopped state continues for the predetermined time, the enabling of unlocking of the invalid setting is ended. The series of processing is thus completed.

According to the present configuration, it is possible to effectively use, during movement, a voice call and voice input that do not require the direct manual operation of the mobile terminal 1. Further, fellow passengers other than the driver are also capable of using the mobile terminal as usual.

(3) In the embodiment described above, the determination of movement start and/or in movement was made by using the movement speed; however, an acceleration may also be used for determination (see the dashed-dotted line in FIG. 1). If the determination of movement start and/or in movement is made on the basis of an acceleration by using an acceleration sensor 3', the following advantages are provided. In this case, the movement information acquisition means of the present invention corresponds to the acceleration sensor. The acceleration sensor 3' is a sensor 3' that is permanently installed in the current cell phone, and is used in pedometer applications, etc. Further, as the other sensor 3', a proximity sensor, a luminance sensor, and a gyroscope are usually provided as the current specification in the mobile terminal 1.

The advantages of determining that the mobile terminal is in movement by the acceleration sensor 3' rather than using a GPS include the points described below.

That is, (1) Particularly, with a GPS used for a maximum movement speed of 18 km/h or below, such as in the case of walking or riding a bicycle, etc., it is difficult to perform detection in real time. That is, since it is difficult to instantaneously determine if the mobile terminal is moving, there is a possibility of receiving an incoming call or an e-mail because the functions that should be set to invalid by the control means were considered to be invalid, but actually those functions were not invalid. However, by adopting the acceleration sensor 3', it is possible to reduce such a possibility. Of course, a GPS may be used in combination to further improve the determination accuracy of the movement determination unit 13.

(2) In the case of a GPS, since the location of the mobile terminal 1 is checked with the help of a radio wave from an artificial satellite, there is a problem that the GPS may not react at locations such as inside tunnels where radio waves do not reach. Indeed, the inability to receive a radio wave of an artificial satellite implies that there is no reception of e-mails and no reception of calls, and therefore, it is believed that the above-described problems relating to the present invention do not occur; however, as soon as the mobile terminal moves to a location where reception is enabled, e-mails and calls are likely to be received. Such a problem is avoided by using the acceleration sensor 3'.

Modification Example

As a means of preventing the reminder of a psychological desire to play the game described in the embodiment while in movement, the problem as described hereinbefore is solved by prohibiting a change related to a matter that is essentially associated with an input of a game such as a partial change of an update of a display of a game screen, or alternatively, prohibiting the display of the game screen per se. In addition to such a means, however, a point to be awarded may be set so as to be higher when a game is played while not in movement.

In the case of this modification example, in the storage unit of FIG. 1, in the game program, point values according to a variety of missions such as the game records according to the range of the movement speeds as described previously are stored for changing the point values obtained according to the movement speed, and when a game is determined to be played while not in movement by the movement determination unit 13, the highest point value is displayed on the display unit with reference to the data stored in the storage unit. In addition, when the movement speed is determined to be between 18 km/h to 200 km/h, for example, by the determination unit 13, the amount of points to be obtained is zero, or otherwise less than the points that can be obtained when travelling at a speed that is less than 18 km/h. When it is presumed that there is a movement inside the Shinkansen train that travels at an ultra-high speed of 200 km/h or more, and the movement speed is determined by the determination unit 13 in such a manner that a player is not playing a game, the control unit 6 executes the game program so that a lower point can merely be obtained than that in a case where the game is determined to be played while not in movement by the movement determination unit 13, and control of the point acquisition quantity is thereby executed.

The control of the point acquisition quantity is thus executed according to the movement speed; and therefore, even if the game screen displayed on the display unit 9 has been updated in such a manner that a game player desires to play a game, it is possible to prompt an input of the game after the user has interrupted the movement and then completely stopped.

That is, in the control unit 6, the game program is executed by operation of the operation unit 8, and the game is started (S100).

When a movement is determined by the movement determination unit 13 (S200: YES), it is determined that the movement speed belongs to a static state that is a first group or belongs to a high speed movement state that is a second group, or alternatively, belongs to an ultra-high speed movement that is a third group (S300), and the point data of the determined group is then set (S400). This point data is stored in the storage unit 7.

After the input of the game has been completed by the operation unit 8, when point awarding is determined in accordance with the flow of the game, although not shown, the point value on the basis of the set point data is displayed on the display unit 9.

That is, in the game program executed by the control unit 6 of the mobile terminal 1, the mobile terminal 1 comprises:
a communication unit 5;
a display unit 9 of displaying various types of information;
a movement information reception unit 3 of acquiring information indicating movement of the mobile terminal 1;
a movement determination unit 13 of determining whether or not the mobile terminal 1 is moving and is changing in movement speed on the basis of the information that is acquired by the movement information reception unit 3;
an operation unit 8 for executing a game;
a storage unit 7; and
a control unit 6 of controlling each of the units, and the game program, while being stored in the storage unit 7, causes the control unit 6 of the mobile terminal 1 to execute the following processes:
a process of, when the mobile terminal 1 is determined to be moving by the movement determination unit 13, setting point data according to the determined movement speed, the point data being stored so as to be associated with each of the preset movement speeds of the mobile terminal 1, and
a process of, when display data that is generated by the game program and prompts an input of a game is displayed, employing items of point data different from each other according to the movement speed to thereby execute point awarding according to a result obtained when the game is input by employing the operation unit.

If a movement speed increases, an item of point data is stored in the storage unit 7 so as to be associated with the movement speed in such a manner that lower point data is merely acquired even if the same game result is obtained.

INDUSTRIAL APPLICABILITY

The present invention has an industrial applicability for the purpose of avoiding a dangerous act referred to as "smartphone walking", by determining that a user of a mobile phone is in movement and then restricting a display of a trigger to prompt a further desire for inputting data to the mobile phone, when calling or exchanging message data is performed or when a game is played.

What is claimed is:

1. A mobile terminal that is capable of performing data communication and calling, comprising:
   a communication unit that is configured to place calls and exchange message data;
   a display unit that displays various types of information;
   a notification unit that issues a notification of an incoming call;
   a movement information acquisition unit that acquires information indicating movement of the mobile terminal, if any;
   a movement determination unit that determines whether or not the mobile terminal is moving on the basis of information that is acquired by the movement information acquisition unit; and
   a control unit that controls a display of incoming call or reception information in a non-displayed manner on the display unit when the mobile terminal is determined to be moving by the movement determination unit,
   wherein the control unit is programmed such that when there is an incoming call to the mobile terminal and the mobile terminal is determined to be moving, the control unit automatically causes a reply to be sent to a transmission-side terminal, via a voice or email message, indicating that the mobile terminal is moving.

2. The mobile terminal according to claim 1, wherein the movement determination unit determines whether or not the mobile terminal is moving at a translational speed indicative of at least walking by a user, and the control unit is programmed such that when there is an incoming call to the mobile terminal and the mobile terminal is determined to be moving at a translational speed indicative of at least walking by the user, the control unit automatically causes a reply to be sent to a transmission-side terminal, via a voice or email message, indicating that the mobile terminal is moving.

3. A mobile terminal that is capable of performing data communication and calling, comprising:
   a communication unit that is configured to place calls and exchange message data;
   a display unit that displays various types of information;
   a notification unit that issues a notification of an incoming call or incoming data;
   a movement information acquisition unit that acquires information indicating movement of the mobile terminal, if at all;
   a movement determination unit that determines whether or not the mobile terminal is moving on the basis of information that is acquired by the movement information acquisition unit; and
   a control unit that controls a display of incoming call or reception information in a non-displayed manner on the display unit when the mobile terminal is determined to be moving by the movement determination unit,
   wherein a plurality of categories based on a movement speed of the mobile terminal are predetermined, and
   the control unit invalidates notification of an incoming call or incoming data in accordance with the category to which a movement speed of the mobile terminal, as determined by the movement determination unit, belongs.

4. The mobile terminal according to claim 3, wherein the movement determination unit determines whether or not the mobile terminal is moving at a translational speed indicative of at least walking by a user, and
   the control unit is programmed to invalidate notification of an incoming call or incoming data in accordance with the category to which a translational movement speed of the mobile terminal, as determined by the movement determination unit, belongs.

5. A mobile terminal, comprising:
   a communication unit;
   a display unit which displays various types of information;
   a movement information reception unit which acquires information indicating movement of the mobile terminal, if any;
   a movement determination unit which determines a speed at which the mobile terminal is moving, if at all, on the basis of the information that is acquired by the movement information reception unit;
   an operation unit that executes a game;
   a data storage unit;
   a control unit; and
   program instructions stored within the data storage unit which, when executed by the control unit, cause the control unit of the mobile terminal to execute the following processes:
      causing the movement determination unit to determine a movement speed of the mobile terminal; and
      when the mobile terminal is determined to be moving in accordance with one of a plurality of predefined speed categories, employing display data and prompting an input of a game to thereby prohibit or set and restrict, in a non-display manner, an update of a display of a game screen in such a manner as to prompt an input to the operation unit for a game while the mobile terminal is moving.

6. The terminal according to claim 5, wherein the plurality of speed categories includes a first speed category and a second speed category having speeds that are higher than speeds within the first speed category, and
   the program instructions cause the control unit to execute the following processes:
      a process of restricting an update of the game screen when the movement speed of the mobile terminal is determined to be within the first speed category; and
      a process of restricting control which restricts an update of the game screen so that a game can be executed even while in movement when the movement speed of the mobile terminal is determined to be within the second speed category.

7. A game control method for executing a program on a mobile terminal having a call function and/or a texting function and a game-execution function for executing a game, the method comprising the following processes:
   downloading the game program by a calling or message-data communication unit of the mobile terminal;
   executing the downloaded game program by a control unit, and according to a game operation exerted by an operation unit that is connected to the control unit, causing a display unit that is connected to the control unit to display a variety of game screens, including information prompting a further operation exerted by the operation unit;
   acquiring information indicating movement of the mobile terminal, if any, and determining a speed with which the mobile terminal is moving; and
   depending on which of a plurality of speed categories the movement speed of the mobile terminal belongs to, 1) prohibiting or setting in a non-display manner an update that includes display data generated by the game program and that prompts an input to a game being executed on the mobile terminal, or 2) updating a display of the game in such a manner as to prompt an input for the operation unit for the game even while the mobile terminal is moving.

8. The game control method according to claim 7, wherein
   the plurality of speed categories includes a first speed category and a second speed category having speeds that are higher than speeds within the first speed category; and
   the control unit restricts updating of the game screen when the movement speed of the mobile terminal is determined to fall within the first speed category and releases control, which restricts updating of the game screen, so that a game can be executed even while the mobile terminal is moving when the movement speed of the mobile terminal is determined to fall within the second speed category.

9. A mobile terminal, comprising:
   a communication unit;
   a display unit which displays various types of information;
   a movement information reception unit which acquires information indicating movement of the mobile terminal, if any;
   a movement determination unit which determines a speed at which the mobile terminal is moving, if at all, on the basis of the information that is acquired by the movement information reception unit;
   an operation unit that executes a game;
   a data storage unit;
   a control unit; and program instructions stored within the data storage unit which, when executed by the control unit, cause the control unit of the mobile terminal to execute the following processes:
causing the movement determination unit to determine a movement speed of the mobile terminal; and
awarding points upon the occurrence of various event during play of a game on the mobile terminal,
wherein, for at least some of the events, the number of points awarded upon the occurrence of a given event varies depending on the speed at which the mobile terminal is moving.

10. The mobile terminal according to claim 9, wherein, for at least some of the events, fewer points are awarded upon the occurrence of a given event when the mobile terminal is moving at one speed than are awarded upon the occurrence of the given event when the mobile terminal is moving at another speed that is less than said one speed.

* * * * *